United States Patent
Suess

(10) Patent No.: US 6,241,262 B1
(45) Date of Patent: Jun. 5, 2001

(54) INDEPENDENT WHEEL SUSPENSION IN SEMI-TRAILING, TRAILING OR COMPOUND ARM CONSTRUCTION WITH AN UNCOUPLED WHEEL CARRIER

(75) Inventor: Johann Suess, Korb (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/356,275

(22) Filed: Jul. 19, 1999

(30) Foreign Application Priority Data

Jul. 18, 1998 (DE) .............................................. 198 32 384

(51) Int. Cl.$^7$ ...................................................... B62B 5/02
(52) U.S. Cl. .................... 280/5.522; 280/5.523; 280/5.524; 280/5.52; 280/124.128
(58) Field of Search ............................ 280/5.522, 5.523, 280/5.524, 5.52, 124.128

(56) References Cited

U.S. PATENT DOCUMENTS

| | | | |
|---|---|---|---|
| 4,157,840 | * | 6/1979 | Kroniger et al. ................... 280/5.52 |
| 4,706,989 | * | 11/1987 | Iijima et al. ....................... 280/5.522 |
| 4,714,270 | * | 12/1987 | Rumpel .............................. 280/5.522 |
| 4,720,121 | * | 1/1988 | Kikuchi et al. .................... 280/5.522 |
| 4,758,018 | * | 7/1988 | Takizawa et al. .................. 280/5.52 |
| 5,018,757 | * | 5/1991 | Kkozuka ............................ 280/5.522 |
| 5,246,248 | * | 9/1993 | Ferguson ........................... 280/5.522 |
| 5,292,149 | * | 3/1994 | Luger ................................. 280/5.522 |
| 5,577,771 | * | 11/1996 | Lee .................................... 280/5.523 |
| 5,685,556 | | 11/1997 | Shibue et al. ...................... 280/690 |
| 5,829,764 | * | 11/1998 | Grifliths ............................. 280/5.522 |
| 5,975,541 | * | 11/1999 | Harara et al. ...................... 280/5.523 |
| 6,036,201 | * | 3/2000 | Pond et al. ......................... 280/5.522 |

FOREIGN PATENT DOCUMENTS

| | | |
|---|---|---|
| 1 077 538 | 10/1958 | (DE) . |
| 2 158 931 | 5/1973 | (DE) . |
| 2 311 480 | 9/1974 | (DE) . |
| 196 47 303 | 5/1998 | (DE) . |
| 2 700 992 | 8/1994 | (FR) . |
| 2 721 258 | 12/1995 | (FR) . |
| 2 726 227 | 5/1996 | (FR) . |

\* cited by examiner

*Primary Examiner*—Lanna Mai
*Assistant Examiner*—Toan To
(74) *Attorney, Agent, or Firm*—Evenson, McKeown, Edwards & Lenahan, P.L.L.C.

(57) ABSTRACT

An independent wheel suspension in a semi-trailing or compound arm construction having a wheel suspending semi-trailing or compound arm which is disposed at at least two points on the vehicle body and which has a wheel carrier which can be swivelled approximately about a vertical axis. The swivelling axis of the wheel carrier is situated behind the wheel axle with respect to the driving direction, whereas the wheel carrier in front of the wheel axle is elastically supported in the transverse direction of the vehicle on the semi-trailing or compound arm. Between the wheel carrier and the semi-trailing arm or a compound arm, a swing arm with approximately vertical swivelling axes is arranged in the area behind the wheel axle. In this case, viewed in the transverse direction of the vehicle, the wheel-carrier-side swivelling axis of the swing arm is situated in the proximity of the wheel center plane, while the semi-trailing-arm-side swivelling axis of the swing arm is situated in the area of the wheel-interior rim flange. An independent wheel suspension which has a lateral-force-oversteering effect while the longitudinal suspension comfort is high.

9 Claims, 1 Drawing Sheet

INDEPENDENT WHEEL SUSPENSION IN SEMI-TRAILING, TRAILING OR COMPOUND ARM CONSTRUCTION WITH AN UNCOUPLED WHEEL CARRIER

BACKGROUND AND SUMMARY OF THE INVENTION

This application claims the priority of German patent 198 32 384.0, filed Jul. 18, 1998, the disclosure of which is expressly incorporated by reference herein.

The invention relates to an independent wheel suspension in a semi-trailing, trailing or compound arm construction having a wheel suspending semi-trailing, trailing or compound arm which is disposed at at least two points on the vehicle body and which has a wheel carrier which can be swivelled approximately about a vertical axis, the swivelling axis of the wheel carrier being situated behind the wheel axle with respect to the driving direction, whereas the wheel carrier in front of the wheel axle is elastically supported in the transverse direction of the vehicle on the semi-trailing, trailing or compound arm.

An independent wheel suspension of this type is known from German Patent Document DE-OS 21 58 931 (corresponding to GB 1 345 859). During cornering, the wheel carrier changes its position relative to the semi-trailing arm. On the wheel which is on the outside during the cornering, the wheel carrier swivels against the semi-trailing arm, in which case the wheel assumes the toe-in position. As the result of the relatively rigid bearing between the semi-trailing arm and the wheel carrier, the semi-trailing arm bearing must be elastically disposed with respect to the vehicle body. During cornering, the flexibility of the semi-trailing arm bearing reduces the positive toe-in change because of the special wheel carrier bearing.

The invention is based on the problem of providing an independent wheel suspension in the semi-trailing or compound arm construction which has a lateral-force-oversteering effect while the longitudinal suspension comfort is high.

The problem is solved by independent suspension for a vehicle wheel, comprising: a wheel suspending arm disposed on the vehicle; a wheel carrier elastically supported in a transverse vehicle direction on the wheel suspending arm via an elastic joint located forward of an axle of the vehicle wheel relative to a vehicle forward driving direction, said wheel carrier being swivellable about a wheel-carrier swivelling axis which is at least approximately vertical, which is located proximate a center plane of the vehicle wheel, and which is located behind the axle relative to the vehicle forward driving direction; and a swing arm arranged behind the wheel axle, said swing arm being coupled to said wheel carrier at said wheel-carrier swivelling axis, said swing arm being coupled to said wheel suspending arm at an arm-side swivelling axis which is at least approximately vertical, and which is located proximate an inner rim flange of the vehicle wheel.

According to the invention, a swing arm, which has approximately vertical swivelling axes, is arranged between the wheel carrier and the semi-trailing arm or a compound arm in the area behind the wheel axle. In this case, viewed in the transverse direction of the vehicle, the wheel-carrier-side swivelling axis of the swing arm is situated in the proximity of the wheel center plane, while the semi-trailing-arm-side swivelling axis of the swing arm is situated in the area of the wheel-interior rim flange.

A rim space area is defined as the proximity of the wheel center plane which is halved by the wheel center plane and has a depth of half the rim width. The area of the wheel-interior rim flange is a zone which extends from the rim flange plane of the interior rim flange in each case by a quarter of the rim width into the rim space and out of the rim space.

The wheel carrier is not rigidly arranged on the semi-trailing arm but, on the one hand, is disposed by way of a swing arm aligned approximately transversely to the driving direction in the construction of a four-point arm and, on the other hand, is disposed in a sliding joint with an elastic intermediate layer. The wheel carrier, which, with respect to the transmission, is uncoupled from the semi-trailing arm, together with the swing arm, forms a type of slider crank, in the case of which the swing arm is the crank while the wheel carrier represents the slide member.

During all acceleration operations, the crank, thus the swing arm, swings by several angular degrees about a neutral position. The wheel suspension, which is relatively soft in the longitudinal direction of the vehicle, has a high longitudinal suspension comfort. During a swinging motion caused by braking, the wheel changes into a stabilizing toe-in. During cornering manevers, the independent wheel suspension has a lateral-force-understeering effect since, because of the elastic flexibility of the slide joint, the wheel steers into the turn.

The special type of the bearing of the wheel carrier on the wheel-suspending semi-trailing arm can also be used in the case of different axle types, for example, in the case of a compound arm axle. In the case of this axle type, the respective trailing arm takes over the bearing of the wheel carrier.

Other objects, advantages and novel features of the present invention will become apparent from the following detailed description of the invention when considered in conjunction with the accompanying drawings.

DETAILED DESCRIPTION OF THE DRAWINGS

Figure 1:
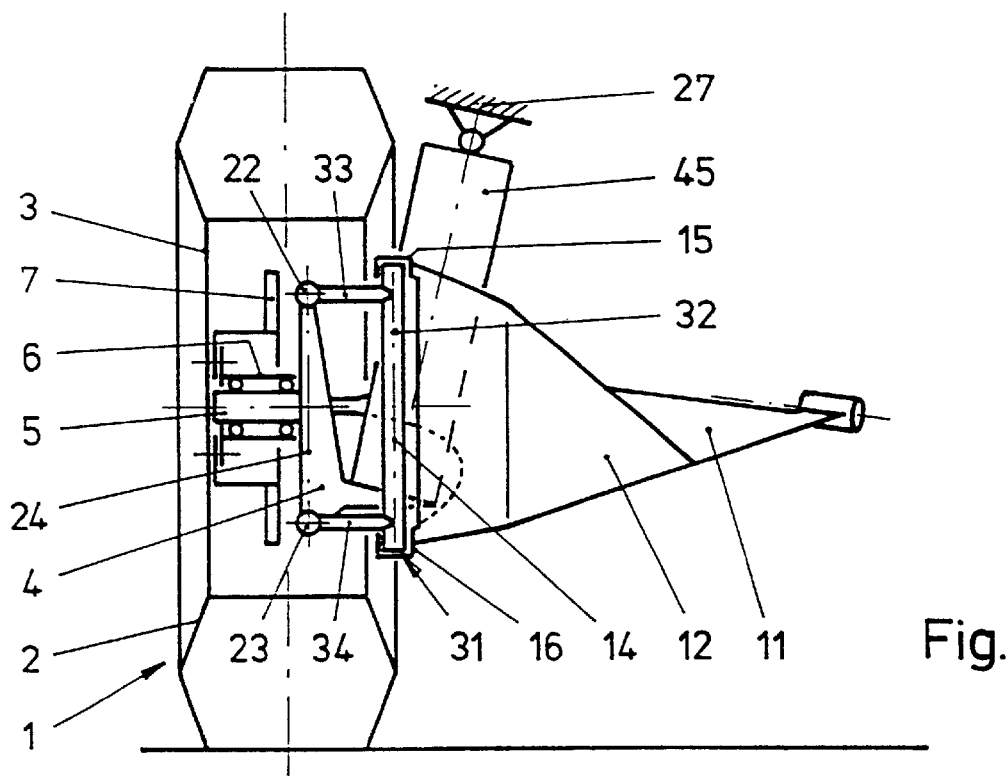
FIG. 1 is a rear view of the independent wheel suspension according to a preferred embodiment of the present invention.
Figure 2:
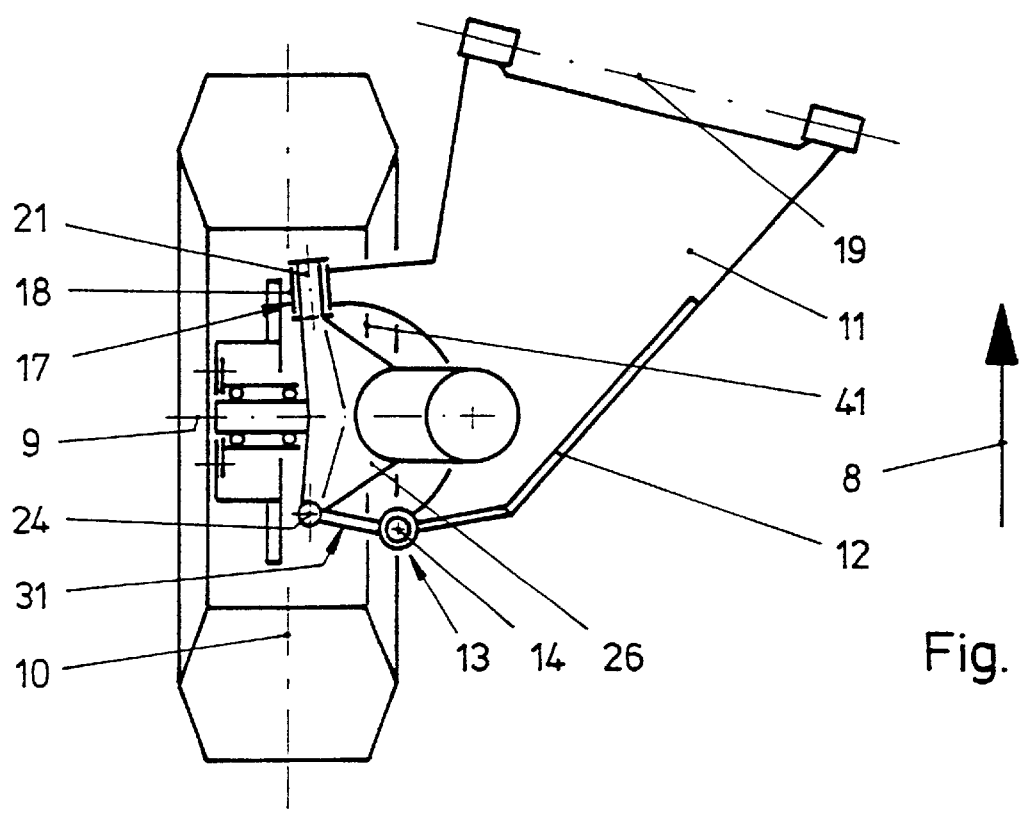
FIG. 2 is a top view of the independent wheel suspension according to FIG. 1.

FIGS. 1 and 2 show an independent wheel suspension in a semi-trailing arm construction. By way of a hinged wheel carrier (4), a semi-trailing arm (11) carries a wheel (1, 2, 3). As known, the wheel is disposed in a roller-bearing-type manner by way of a wheel hub (6) on an axle journal (5) arranged on the wheel carrier (4). Among other components, a brake disk (7) and a rim (3) carrying the tire (2) are mounted on the wheel hub (6).

The semi-trailing arm (11) swing about a swivelling axis (19) and ends in the area of the wheel (1) in a fork-type pivot bearing (13) and in an elastokinematic slide joint (17). The pivot bearing (13), which has an approximately vertical swivelling axis (14), comprises on the semi-trailing arm side, for example, an upper and a lower bearing bush (15) and (16). A swing arm (31) supporting the wheel carrier (4) is disposed between the bearing bushes (15) and (16). In the illustrated embodiment, the bearing bushes (15, 16) are fastened on a reinforcing metal plate (12) molded to the semi-trailing arm (11).

The slide joint (17), which is illustrated in FIG. 2 and which is situated approximately at the level of the wheel center, is a collar (18) which comprises a sliding pin (21) arranged on the wheel carrier (4). The height of the slide joint (17) can influence the lateral-force-neutral point. A slide joint (17) arranged at a higher level causes a lateral-force-neutral point situated further in the rear.

Between the collar (18) and the sliding pin (21), an elastic component is situated which is, for example, vulcanized in. The displacement path in the longitudinal direction of the collar, which is the result of the material characteristics of the elastic component and the design of the slide joint (17), may be limited by stops.

The center line of the slide joint (17) of the left motor vehicle rear wheel (1) illustrated here, viewed in the driving direction (8), extends toward the left outside. Together with the longitudinal axis of the vehicle, it encloses an angle which may amount to up to 15°.

Viewed from above, the wheel carrier (4) has two joints (22, 23) located behind the wheel center relative to the driving direction (8) by way of which the wheel carrier (4) is disposed on the swing arm (31). The joints (22, 23) are situated on a swivelling axis (24) which is aligned, for example, in parallel to the swivelling axis (14).

In the illustrated embodiment, the swing arm (31), which is constructed as a four-point arm, consists of a non-rotatable arm bolt (32) and two brackets (33, 34) which project perpendicularly therefrom. Both brackets (33, 34) extend, for example, in parallel to one another and, together with the arm bolt (32), form a dimensionally stable composite construction. Measured between the swivelling axes (14) and (24), they have, for example, a length which corresponds to half the rim opening. The swing arm (31) may be stiffened between the brackets (33, 34).

The swing arm (31) is arranged between the semi-trailing arm (11) and the wheel carrier (4) such that the swivelling axis (24) is situated forward of the swivelling axis (14) relative to the driving direction (8). The swivelling axis (24) is situated proximate the area of the wheel center plane (10), while the swivelling axis (14) is situated proximate the interior rim flange (41); compare FIG. 1. The range width for the position of the swivelling axis (24) and the zone width for the position of the swivelling axis (14) may in each case be in the range of several centimeters.

During the operation of a vehicle having such a wheel suspension, the wheel carrier (4) with the wheel (1) can move back and forth depending on the load—approximately in the longitudinal direction of the vehicle—with different amplitudes. In this case, the swing arm (31) swings about the swivelling axis (14) and the wheel carrier (4) moves by way of the pin (21) relative to the collar (18). The movement of the uncoupled wheel carrier (4) is damped by an elastic insert between the collar (18) and the pin (21). The longitudinal suspension comfort generated by the uncoupling can be designed so precisely that an axle support is no longer absolutely necessary for improving the driving comfort. The swivel joints of the semi-trailing arm (11) situated on the swivelling axis (19) may also have a rigid design, which permits a precise arm guidance.

If the swing arm (31) and the slide joint (17)—as illustrated in the figures—are adjusted, a stabilizing toe-in occurs during the braking of the vehicle on the wheel (1). As the result of the braking, the wheel (1) moves relative to the semi-trailing arm (11) against the driving direction (8). The swing arm (31), which, according to FIG. 2, swivels counterclockwise, presses the wheel (1) behind the wheel center plane (9) to the outside, while the slide joint (17) guides the wheel (1) in front of the wheel center line (9) toward the inside.

Since the slide joint (17) can also elastically yield in the transverse direction of the vehicle, the construction also improves the vehicle handling during cornering maneuvers. If the wheel (1) illustrated in FIG. 2 is a rear wheel, which is on the outside during the cornering, a lateral force loading the wheel (1) causes a swivelling of the wheel carrier (4) clockwise about the swivelling axis 14. Within the scope of the elastic flexibility of the rubber-elastic insert integrated in the slide joint (17), the pin (21) is pressed in the direction of the vehicle center. After the cornering, the pin (21) centers automatically in the collar 18.

The joints of the swing arm (31) have a rigid construction, so that a precise wheel suspension is achieved and, during braking, the wheel does not change its caster angle or changes only slightly.

According to FIGS. 1 and 2, the wheel carrier (4) is supported, for example, by way of a coil spring (45) directly on the vehicle body (27). The coil spring (45) is disposed on a spring bracket (26) arranged on the wheel carrier (4). In this construction, the coil spring (45) projecting diagonally into the rim space requires little space in the wheel house. As the result of its diagonal position, it presses the wheel (1) toward the outside during the compression which, among other things, results at least in a slight camber reduction during compression of the spring.

In addition, the loading by the normal wheel force in the joints (22, 23), the bearing bushes (15, 16) and the bearings of the semi-trailing arm (11) is less in the vertical direction since the normal wheel force is introduced directly from the uncoupled wheel carrier (4) by way of the coil spring (45) into the vehicle body (27). Only the moment caused by the shifting from the wheel center plane (10) to the wheel center takes place by way of the joints (22, 23), the bearing bushes (15, 16) and the bearings of the semi-trailing arm (11).

Naturally, the coil spring (45) or the like can also be conventionally supported on the semi-trailing arm (11).

The independent wheel suspension according to the invention can also be used in driven axles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Independent suspension for a vehicle wheel, comprising:
   a wheel suspending arm disposed on the vehicle;
   a wheel carrier elastically supported in a transverse vehicle direction on the wheel suspending arm via an elastic joint located forward of an axle of the vehicle wheel relative to a vehicle forward driving direction, said wheel carrier being swivellable about a wheel-carrier swivelling axis which is at least approximately vertical, which is located proximate a center plane of the vehicle wheel, and which is located behind the axle relative to the vehicle forward driving direction; and
   a swing arm arranged behind the wheel axle, said swing arm being coupled to said wheel carrier at said wheel-carrier swivelling axis, said swing arm being coupled to said wheel suspending arm at an arm-side swivelling axis which is at least approximately vertical, and which is located proximate an inner rim flange of the vehicle wheel.

2. Independent wheel suspension according to claim 1, wherein said wheel suspending arm is one of a semi-trailing arm, a trailing arm, and a compound arm.

3. Independent wheel suspension according to claim 1, wherein said swing arm is set in a neutral position at an angle of up to 15° relative to the transverse vehicle direction, the wheel-carrier swivelling axis being situated forward of the arm-side swivelling axis relative to the vehicle forward driving direction.

4. Independent wheel suspension according to claim 1, wherein said elastic joint is a slide joint comprising a collar coupled to the wheel suspending arm and a pin coupled to the wheel carrier, said collar being slidably disposed on said pin.

5. Independent wheel suspension according to claim 4, wherein said collar and said pin are slidable relative to each other about a sliding axis which is approximately parallel to the vehicle forward driving direction, said collar and said pin being elastically movable relative to each other in said transverse vehicle direction.

6. Independent wheel suspension according to claim 1, wherein said collar defines a sliding axis arranged at an angle of up to 15° with the vehicle forward driving direction, a forward end of said pin being situated further outside relative to a vehicle center plane than a rearward end of said pin.

7. Independent wheel suspension according to claim 1, wherein said swing arm has four connection points, said four connection points having a rigid construction.

8. Independent wheel suspension according to claim 1, further comprising a spring element for supporting the wheel carrier against a body of the vehicle.

9. Independent wheel suspension according to claim 1, wherein the wheel suspending arm is capable of being disposed directly on a body of the vehicle.

* * * * *